United States Patent Office 2,948,707
Patented Aug. 9, 1960

2,948,707

ISOCYANATE-BASED POLYMERS CONTAINING AT LEAST TWO DIFFERENT TYPES OF POLYMERIC SEGMENTS

Anthony F. Benning, Woodstown, N.J., assignor to E. I. du Pont de Nemours and Company, Wilmington, Del., a corporation of Delaware No Drawing. Filed Sept. 14, 1955, Ser. No. 534,378

15 Claims. (Cl. 260—77.5)

This invention relates to isocyanate-based elastomers and more particularly to isocyanate-based elastomers which contain at least two different classes of polymeric segments.

In the preparation of isocyanate-based elastomeric condensation products, various different types of polymeric materials have been used. These elastomers exhibit properties which distinguish them from both natural and synthetic rubber, from unsaturates, such as butadiene and its various copolymers and modifications thereof, such as neoprene, GR–S and the acrylic rubbers. Some of these isocyanate-based elastomers do, however, present some very definite shortcomings, such as in low resistance to water and inferior low temperature properties.

It is an object of the present invention to provide isocyanate-based elastomers containing at least two different polymeric segments. A further object is to provide elastomers containing at least two different polymeric segments which exhibit better properties than elastomers derived solely from the individual polymeric segments. Other objects will appear hereinafter.

These and other objects of the following invention are accomplished by a segmented, isocyanate-based polymer, containing at least two different classes of polymeric radicals, said polymer consisting essentially of units having the formula:

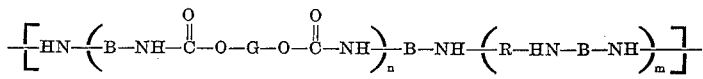

wherein O—G—O is a bivalent, polymeric radical obtained by removing the terminal active hydrogen atoms from an organic compound having a molecular weight of at least 750 selected from the group consisting of the following classes: (1) polyalkyleneether glycols, (2) polyalkylene-aryleneether glycols, (3) polyhydrocarbon glycols of the formula HO—L—OH wherein L is a bivalent radical formed by the polymerization of ethylenically unsaturated monomers at least 50 percent of which are conjugated dienes, (4) polyalkylene-aryleneether-thioether glycols and (5) polyalkyleneether-thioether glycols; B is a bivalent, non-polymeric, organic radical, said radical being inert to isocnayate groups; R is a bivalent radical selected from the group consisting of carbonyl, non-polymeric diacyl radicals and polymeric hydrocarbon radicals containing terminal acyl groups, said polymeric hydrocarbon radicals being formed by the polymerization of ethylenically unsaturated monomers at least 50 percent of which are conjugated dienes, with the proviso that when R is a polymeric hydrocarbon radical containing terminal acyl groups, O—G—O is other than a radical obtained from said polyhydrocarbon glycol; $n$ is an integer greater than zero; and $m$ is an integer including zero; each of said units being connected to the next by a radical selected from the group consisting of carbonyl radicals, non-polymeric diacyl radicals and polymeric diacyl radicals the polymeric portion of which is selected from the group consisting of the following classes: (1) polyalkyleneether radicals, (2) polyalkylene-aryleneether radicals, (3) polymeric hydrocarbon radicals formed by the polymerization of ethylenically unsaturated monomers at least 50 percent of which are conjugated dienes, (4) polyalkylene-aryleneether-thioether radicals and (5) polyalkyleneether-thioether radicals, with the proviso that when said units are connected by a polymeric diacyl radical, the polymeric O—G—O radical is not of the same class as the polymeric diacyl radical; there being at least two different classes of polymeric radicals in the polymer with not more than 95 mol percent of any one present and at least 60 percent of the total weight of the polymer being polymeric radicals, each of said polymeric radicals having a molecular weight of at least about 750.

In the present specification and claims the polymeric segments are to be regarded as being of "different classes" when they have chemical structures of different types, for example, bivalent radicals O—G—O derived from different polyalkyleneether glycols which differ merely in molecular weight or are homologs of one another are of the same class but a bivalent radical O—G—O derived from a polyalkyleneether glycol is of a different class from one derived from a polyalkylene-aryleneether glycol, a polyhydrocarbon glycol, a polyalkylene-aryleneether-thioether glycol or a polyalkylene-ether-thioether glycol, each of which in turn represents a different class.

In the preparation of these isocyanate-based elastomers, one or more of the polymers which will make up one of the polymeric segments may be reacted with a diisocyanate to form an isocyanate-terminated prepolymer which may then be chain-extended with the other polymeric segment. Alternatively, these elastomers may be prepared by reacting two or more different polymers simultaneously or stepwise with the diisocyanate and then chain-extending the resulting isocyanate-terminated prepolymer with a non-polymeric compound such as water, a diamine, a glycol or a dicarboxylic acid. The extent of chain-extension may be controlled by the addition of certain types of amines as more particularly described in U.S. Patent 2,917,486. In general, it is only necessary to heat the various ingredients in suitable mixing equipment at temperatures from about 25° C. to 125° C. The elastomers may also be prepared by carrying out the reaction in various solvents.

The polyalkyleneether glycols which may be used to prepare the segmented, isocyanate-based elastomers of the present invention may be represented by the formula HO(GO)$_n$H, wherein G stands for an alkylene radical and $n$ is an integer sufficiently great so that the molecular weight is at least 750. These compounds are ordinarily derived from the polymerization of cyclic ethers such as alkylene oxides or dioxolane or from the condensation of glycols. They are sometimes known as polyalkylene glycols, polyalkylene oxide glycols, polyglycols or polyoxyalkylene diols. Not all of the alkylene radicals present in the polyalkyleneether glycols need be the same. For purposes of the present invention, a polytetramethyleneether glycol is generally preferred in preparing the segmented elastomers. Other glycols which may be used are polyethyleneether glycol, polypropyleneether glycol and poly-1,2-butyleneether glycol. The preparation of elastomers containing these polyalkyleneether glycol segments is more particularly described in U.S. Patent 2,929,800.

The polyalkylene-aryleneether glycols which may be used are similar to the above described polyalkyleneether glycols except that part of the alkylene groups are replaced by arylene groups. Here again it is necessary that the glycol have a molecular weight of at least 750. The preparation of these glycols and their use in forming elastomeric condensation products is more particularly described in U.S. Patent No. 2,843,568.

The polyhydrocarbon glycols or amines which may be used may be prepared by polymerizing ethylenically unsaturated hydrocarbons in the presence of compounds which will furnish terminal hydroxyl or amino groups. These polyhydrocarbon glycols or amines may be represented by the formulae HO—L—OH and

respectively, wherein L is a bivalent radical formed by the polymerization of ethylenically unsaturated monomers at least 50 percent of which are conjugated dienes. For example, isoprene may be polymerized in the presence of 2,2'-azo-bis-isobutyronitrile to form a polyisoprene dinitrile which can be converted to a polyisoprene diamine. The use of unsaturated, high molecular weight polyhydrocarbons in the preparation of elastomeric condensation products is more particularly described in U.S. Patent 2,877,212.

The polyether-thioether glycols which may be used may be derived by the condensation of thioethers such as thiodiglycol with other glycols or ether glycols such as butane-1,4-diol, etc. U.S. Patent 2,900,368 more particularly describes the use of polyether-thioether glycols in the preparation of elastomeric condensation products.

Any of a wide variety of organic diisocyanates may be employed in the reaction, including aromatic, aliphatic and cycloaliphatic diisocyanates and combinations of these types. Representative compounds include toluene-2,4-diisocyanate, m-phenylene diisocyanate, 4-chloro-1,3-phenylene diisocyanate, 4,4'-biphenylene diisocyanate, 1,5-naphthylene diisocyanate, 1,4-tetramethylene diisocyanate, 1,6-hexamethylene diisocyanate, 1,10-decamethylene diisocyanate, 1,4-cyclohexylene diisocyanate, 4,4'-methylene-bis(cyclohexyl isocyanate) and 1,5-tetrahydronaphthylene diisocyanate. Arylene diisocyanates, i.e., those in which each of the two isocyanate groups is attached directly to an aromatic ring, are preferred. In general, they react more rapidly with the polyalkyleneether glycols than do the alkylene diisocyanates. Compounds such as toluene-2,4-diisocyanate in which the two isocyanate groups differ in reactivity are particularly desirable. The diisocyanates may contain other substituents, although those which are free from reactive groups other than the two isocyanate groups are ordinarily preferred. In the case of the aromatic compounds, the isocyanate groups may be attached either to the same or to different rings. Dimers of the monomeric diisocyanates and di(isocyanatoaryl) ureas such as di(3-isocyanato-4-methylphenyl) urea, which are the subject of U.S. Pat. 2,757,185, may be used.

The non-polymeric chain-extending agent which may be used in the preparation of these segmented, isocyanate-based elastomers is a compound containing a plurality of active hydrogen atoms capable of reacting with isocyanates with no more than two atoms in the molecule having active hydrogen attached thereto. The chain-extending agent may be an inorganic compound or may be an aliphatic, aromatic, cycloaliphatic or mixed type organic compound. Typical of the many compounds which are useful in this connection are water, hydrogen sulfide, ethylene glycol, hexamethylene glycol, diethylene glycol, adipic acid, terephthalic acid, adipamide, 1,2-ethanedithiol, hydroquinone, monoethanolamine, 4-aminobenzoic acid, m-phenylenediamine, propylenediamine, 4-aminobenzamide, sulfanilamide, aminopropionic acid, 1,4-cyclohexanedisulfonamide, 1,3-propanedisulfonamide, 4-hydroxybenzoic acid, p-aminophenol, ethylenediamine, succinic acid, succinamide, 1,4-butanedisulfonamide, 2,4-tolylenediamine, bis(4-aminophenyl)methane, β-hydroxypropionic acid and 1,2-ethanedisulfonic acid. Compounds containing at least one amino group are the preferred organic chain-extending agents.

When these non-polymeric chain-extending agents are reacted with the isocyanate-terminated prepolymers containing two or more polymeric segments, or mixtures of prepolymers, the prepolymers react through the free isocyanate groups with the active hydrogen atoms of the chain-extender. The reactions of isocyanates with the active hydrogen-containing groups present in the various typical chain-extending agents are described in the literature as proceeding as follows:

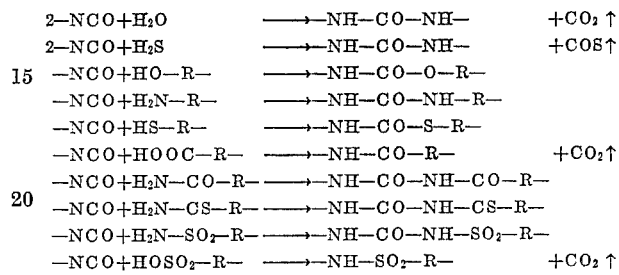

It is quite apparent from the foregoing table that when water and hydrogen sulfide are used, there is a carbonyl linking group between the imino groups. When the other typical chain-extenders are used, an acyl radical is attached to the imino group. Thus, when these other typical chain-extenders react with two free isocyanate groups, a diacyl radical is the connecting radical between the imino groups which are attached to the organic diisocyanate residues.

In a similar manner, when one of the polymers, such as a polyisoprene diamine, is used as a chain-extending agent, there will be a polymeric diacyl radical connecting the imino groups which are attached to the organic diisocyanate residues. The word "acyl" as used throughout the present specification and claims defines the radical which results after the imino radical is removed from the radical derived by reacting the active hydrogen compound or chain-extending agent with an isocyanate group.

The term "active hydrogen atoms" as used throughout the present specification has been well established in the isocyanate art. This term refers to hydrogens which, because of their position in the molecule, display activity according to the Zerewitinoff test as described by Kohler in J.A.C.S., 49, 3181 (1927).

As pointed out above, the segmented, isocyanate-based elastomers of the present invention may be prepared by several general methods. In one typical method, a molar excess of an organic diisocyanate is mixed with one of the polymers, such as a polyalkyleneether glycol, in suitable mixing equipment, at a temperature which is preferably from about 70° C. to 120° C. The resulting prepolymer contains terminal isocyanate groups and when a second polymer, such as a polyisoprenediamine, is added as a chain extending agent, it reacts with the isocyanate-terminated prepolymer and any other unreacted diisocyanate which is present. The resulting elastomer thus contains two different classes of polymeric segments linked to the organic diisocyanate residue through urethane or urea linkages. If substantially all of the isocyanate groups have been used up by reaction with these polymers, the product will be stable and will not cure until additional di- or triisocyanate, or other curing agent, is added. If free isocyanate groups are present, the product is curable without the addition of any extra curing agent. The product containing free isocyanate groups may be molded and cured directly or may be stabilized against premature curing by the addition of small amounts of a nitrogen base containing at least one hydrogen atom attached to nitrogen, as more particularly described in U.S. Patent 2,917,486.

In an alternative precedure, two or more polymers may be reacted simultaneously or stepwise with a molar excess of an organic diisocyanate to produce an isocyanate-terminated prepolymer which may then be chain-extended with a non-polymeric, active hydrogen-containing compound. Here again, if substantially all of the isocyante groups have been used up by reaction with the polymers and the chain-extending agent, the product will be stable and will not cure until additional di- or triisocyanate, or other curing agent, is added.

It has been found that a limited number of solvents of the type containing oxygen or nitrogen, and more particularly mixtures of such solvents, have a definite solvent action on the uncured segmented elastomers of the present invention. Dimethylformamide and tetrahydrofuran and mixtures of the two are the preferred solvents. Thus, elastomers may be prepared according to the above described procedures entirely in solution in such a solvent. The resulting uncured reaction product may be recovered by evaporation of the solvent.

The reaction between one or more of the polymers and the organic diisocyanate may be controlled so as to avoid undesired gel formation by the presence of small amounts of an acid-reacting compound such as an acid chloride, bromide or iodide or an inorganic acid, as disclosed and claimed in U.S. Patent 2,692,873, of Langerak et al. An acid-reacting compound, as for example benzenesulfonyl chloride, may be added to accomplish this control or small amounts of acid-reacting materials may already be present in the other reactants.

The reaction may be accelerated by the presence of the acid salt of an organic tertiary nitrogen or phosphorus base, such as pyridine, as described in U.S. Patent 2,692,874 of Langerak. The presence of such a reaction catalyst is particularly useful during the chain-extension step.

Instead of using the polyether glycols and organic diisocyanates as described above, the polyether glycols can be converted to bischloroformates by reaction with excess phosgene and then reacted with organic diamines. If desired, some phosgene can be left in the bischloroformate to react with the diamines to form urea groups. The urea hydrogens are more reactive with isocyanate curing agents than urethane hydrogens. This bischloroformate route to elastomers is more fully described in U.S. Patent No. 2,835,654.

As mentioned above, the elastomers which are prepared according to the present invention may be cured to form highly useful vulcanized elastomers. Whenever the uncured reaction product is free of or contains only a small number of free isocyanate groups, either because of the proportions of reactants used or because a stabilizer was employed, it is necessary to add an additional amount of an organic polyisocyanate, usually a diisocyanate, to accomplish curing. Any of the diisocyanates previously described as useful in the initial reaction with the polyalkyleneether glycol are suitable for use as curing agents. Diisocyanate dimers and such compounds as di(3-isocyanato-4-methylphenyl) urea are particularly convenient curing agents. This latter compound is disclosed and claimed in U.S. Patent 2,757,185, and its use as a curing agent is disclosed in U.S. Patent 2,818,404. In practice, the addition of from 1 to 20% of a diisocyanate, based on the weight of the uncured reaction product, is adequate for the curing of stabilized products. The diisocyanate may be conveniently mixed with the uncured product on a rubber mill and the mixture may then be cured by placing it in a mold and heating under pressure. Only enough pressure is required to force the elastomer to assume the shape of the mold. The temperatures and pressures used in ordinary rubber processing are satisfactory for use in curing the elastomers of this invention. Pressures of 50 to 1000 pounds per square inch or higher and temperatures of from 80 to 175° C. are ordinarily satisfactory. At the higher temperatures, shorter curing times must be used to avoid degrading the product. Most of the polymers of this invention may be conveniently cured or vulcanized by heating at 130 to 135° C. for about 30 minutes. It is also possible to produce curing at room temperature and atmospheric pressure, particularly when the uncured product is in the form of thin sheets, merely by allowing it to stand for a period of several days or longer.

When the elastomers of the present invention contain an unsaturated polyhydrocarbon segment, sulfur cures may be applied to cure at the double bonds of this segment. Here again normal rubber processing machinery is satisfactory for handling the curing step. The use of a sulfur curing technique may be carried out in combination with the isocyanate curing procedure.

In the preparation of these segmented elastomers, the molar ratio of diisocyanate to the polymers used is preferably between 1.1:1 and 12:1. Ordinarily the molar ratio will not exceed 5:1 with the most useful range being about 1.2:1 to 3:1.

The amount of chain-extending compound used, whether it be one of the polymers itself or any of the other non-polymeric chain-extending agents, may vary considerably. The chain-extending agent serves not only to link together the polymer units so as to lengthen the polymer chain, but its reaction with the isocyanate groups provides active hydrogen atoms which serve as sites for cross linking.

The various polymers which are used to make up the polymeric segments of the elastomers of the present invention have average molecular weights of from about 750 to about 10,000, and these polymeric segments should comprise at least about 60% of the total weight of the elastomer. In the preferred products of this invention, these polymeric segments should comprise from about 60 to 95% of the total weight of the elastomer.

In order to obtain the advantages of having two or more different classes of polymeric segments present in the elastomer, there should not be present more than about 95 mol percent of any one segment. In the event that any one of the segments is present in a greater amount, the synergistic balance of properties achieved by having two or more polymeric segments present is generally not obtained.

The following examples will better illustrate the nature of the present invention; however, the invention is not intended to be limited to these examples. Parts are by weight unless otherwise indicated.

For testing the elastomers, the following methods were used:

T–50 value: The effect of temperature on the elastic nature of the polymers is determined by use of the A.S.T.M. test designated D–599–40 T which is slightly modified by using hexane at −60° C. as the coolant bath liquid instead of acetone. The sample is elongated to 270% of its original length, put into the −60° C. hexane, let stand 5 minutes and the stretching means released. The temperature of the bath is raised 1° C. per minute while observing the retraction of the sample. The T–50 value is the temperature at which the sample has retracted to one-half of the original elongation.

Hardness is determined by A.S.T.M. test D–676–49 T.

Yerzley resiliency is tested by A.S.T.M. test D–945–49 T.

Solvent swell measurements: Small pieces (0.2 to 0.5 gr.) are cut from a thin (about .04 to .08") slab of the vulcanizate and are weighed accurately on an analytical balance. They are placed in test tubes, are covered by about 10 cc. of the desired solvent, and the tubes are stoppered and placed in a 30° C. water bath. After 5 to 6 days, the swollen pieces are removed, blotted rapidly and gently, and are weighed in weighing bottles. The increase in weight times 100 divided by the original weight is the percent weight increase.

Bent loop test: A strip of a vulcanizate slab about 2½ to 3" long and ½ to 1" wide is bent in a loop so that the two ends can be clamped together with a small spring clamp. The assembly is put in a cold box at −20° C. The extent to which the loop opens (at −20° C.) when the clamp is released after a suitable time at −20° C. is a measure of the freeze resistance of the vulcanizate.

The following designations have been used in the examples:

$T_B$=Tensile strength at the break, lbs./sq. in.
$M_{300}$=Modulus at 300% elongation, lbs./sq. in.
$E_B$=Elongation at the break, percent.

EXAMPLE 1

A. Thiodiglycol/butanediol copolymer

A mixture of 604 parts of thiodiglycol, 405 parts of butane-1,4-diol, 13.5 parts of p-toluene sulfonic acid and 222 parts of toluene are heated under reflux for 24 hours. During this time the temperature drops from 118° C. to 95° C. A Dean-Stark trap is added and the water-toluene azeotrope is removed until the temperature reaches 100° C., which requires about 2 hours. Refluxing is then continued an additional 22 hours, after which the water-toluene azeotrope is removed, the toluene being returned to the system and the temperature rises to 143° C. This requires about 10 hours. A total of 172 parts of water is removed.

500 parts of water containing 0.25 part of $H_2SO_4$ is added (after cooling to below 100° C., and removing the Dean-Stark trap) and the mixture refluxed for 1 hour. The contents are cooled somewhat and 40 parts of $Na_2CO_3$ are added carefully and then refluxing is continued another hour. The mixture is transferred to a separating vessel and the aqueous layer is withdrawn. The oil layer is washed successively with a hot solution prepared by mixing 200 parts of a 2% HCl solution with 200 parts of saturated salt solution, and then with 400-part portions of saturated salt solution until the wash is neutral.

The solvent and water are removed from the aqueous layer by distillation under reduced pressure. The maximum pot temperature is 145° C. The residue is taken up in 860 parts of benzene, boiled with 15 parts of charcoal and filtered. The benzene is removed by distillation under reduced pressure, the final heating being at a pot temperature of 140 to 150° C. at 0.4 mm. of mercury pressure for 2 hours. The yield is 628 parts of a light yellow, viscous oil.

Analysis is as follows:

Hydroxyl No. _____ 57.3
Ester No. _____ Nil
Sulfur _____percent__ 19.9
Water _____ .051
Molecular weight _____ 1960

B. Polyisoprene diamine 2720 parts of isoprene and 119.2 parts of 2,2′-azo-bis-isobutyronitrile are agitated in a pressure vessel under nitrogen for 20 hours at 75° C. The mass is cooled, filtered under nitrogen and then steamed under nitrogen to remove residual monomer and tetramethylsuccinonitrile. The polyisoprene dinitrile is taken up in ether, dried over $CaSO_4$, the $CaSO_4$ filtered off and the ether evaporated and a viscous yellow oil is obtained. 75 parts of this polyisoprene dinitrile is dissolved in 400 parts of ether and 22.5 parts of lithium aluminum hydride in 300 parts of ether is added while agitating under an atmosphere of nitrogen. The mixture is then agitated for 2 hours at a gentle reflux and 200 parts of water is then carefully added. The aqueous layer is separated and the ether layer is washed until neutral, dried over $Na_2SO_4$, and the ether evaporated. The polyisoprene diamine has an iodine number of 397 and a molecular weight of 2120 by −$NH_2$ analysis.

C. Elastomer preparation 19.6 parts of the thiodiglycol/butanediol copolymer (1A above) and 3.48 parts of toluene-2,4-diisocyanate are heated at 80° C. for 2 hours to form an isocyanate-terminated prepolymer. After cooling, it is dissolved in 75 parts of tetrahydrofuran.

23.3 parts of polyisoprene diamine (1B above) is dissolved in 75 parts of tetrahydrofuran. To this is added the solution of the prepolymer while stirring at 25 to 30° C. The addition is carried out at a uniform rate over a period of 1.75 hours. 0.4 part of phenyl-β-naphthylamine is added, as an antioxidant, and the tetrahydrofuran is evaporated.

The polymer obtained is milled on a rubber-mill roll at 100° C. for about 10 minutes to insure the removal of solvent. Then 6 parts of 1,3-bis(3-isocyanato-p-tolyl) urea is added for each 100 parts of the polymer on the mill. After thorough milling, the polymer is cured in molds in a press at 134° C. for 30 minutes. The resulting elastomer has the following properties:

Hardness _____ 63.
Hardness after 14 days at −30° C. ___ 75.
T–50 value _____ −43° C.
Bent loop at −20° C. after 5 days____ Opens to 60°.
Water swell—5 days at 30° C. _____ 0.41% increase.

EXAMPLE 2

A. Thiodiglycol-ethylene glycol copolymer

A polyether-thioether glycol is prepared by heating 604 parts of thiodiglycol, 279 parts of ethylene glycol, 13.5 parts of p-toluene sulfonic acid monohydrate

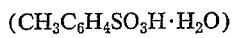
($CH_3C_6H_4SO_3H \cdot H_2O$)

and 174 parts of toluene at the reflux for 22 hours. Water is azeotropically distilled, the water separated, and the toluene returned to the reaction vessel. During this time the temperature rises from 114° C. to 132° C. and 172 parts of water is separated. The polyether-thioether glycol is recovered by the same procedure as Example 1A. The hydroxyl No. is 133, which gives a molecular weight of 844.

B. Preparation of elastomer

Equimolar proportions, 51 parts of the polyether-thioether glycol (2A above) and 55.1 parts of polytetramethyleneether glycol, having a molecular weight of 925, with 1 part of phenyl-β-naphthylamine, as an antioxidant, are mixed and heated to 90 to 95° C. Then 14.1 parts of toluene-2,4-diisocyanate is added and the mass stirred at 100° C. for 3 hours. This produces a polyurethane with hydroxyl end groups.

To 115.5 parts of the polyurethane at 60° C. is added 13.5 parts of toluene-2,4-diisocyanate and stirring at 60° C. is continued for 17 hours to form an isocyanate-terminated prepolymer.

122.1 parts of this prepolymer is dissolved in 538 parts of dry tetrahydrofuran and then 7.41 parts of water is added. The solution is thoroughly mixed and allowed to stand at 25 to 30° C. for 116 hours. The solvent is then evaporated and the polymer dried under vacuum at 80° C.

100 parts of the polymer is compounded on a rubber mill with 15 parts of carbon black, 0.5 part 2-mercapto-benzimidazole, and 10 parts of 1,3-bis(3-isocyanato-p-tolyl)urea. The first three components are blended on a cold mill and then heated to 100° C. for 10 minutes and then the last component is milled in. The product is cured in molds in a press at 134° C. for 30 minutes.

C. Comparison:

Control samples are made as follows:

C–1—Elastomer from the polyether-thioether glycol.

C-2—Elastomer from the polytetramethyleneether glycol.

The process is the same as in 2B above using the following quantities:

|  | C-1 | C-2 |
|---|---|---|
| Polyether-thioether glycol | 63.3 |  |
| Polytetramethyleneether glycol |  | 192.3 |
| Phenyl-β-naphthylamine | .63 | 1.94 |
| Toluene-2,4-diisocyanate | 8.79 | 24.7 |
| Polyurethane glycol | 66.8 | 211.5 |
| Toluene-2,4-diisocyanate | 8.0 | 23.7 |
| Prepolymer Isocyanate-Terminated | 72.7 | 233.5 |
| Tetrahydrofuran | 295 | 948 |
| Water | 3.6 | 12.4 |

The properties of the three products are compared in the table below:

|  | C-1 | Example 2-B | C-2 |
|---|---|---|---|
| Tensile strength at the break, lbs./sq. in., 25° C | 3,550 | 4,750 | >5,100 |
| Modulus at 300% extension, lbs./sq. in., 25° C | 1,950 | 2,530 | 2,500 |
| Elongation at break, Percent, 25° C | 480 | 430 | 430 |
| T-50 Value, ° C | −9 | −20 | −8 |
| Hardness | 75 | 77 | 82 |
| Resilience | 56 | 59 | 65 |
| Solvent Swell: |  |  |  |
| Water | 7.7 | 5.2 | 5.4 |
| ASTM oil No. 3 | 2.7 | 5.9 | 8.5 |

It is obvious from the above table that the elastomer containing both polymeric segments (2–B) exhibits a definite synergistic improvement in the underlined values.

EXAMPLE 3

A. Polyether-thioether polymer

An equimolar mixture of a polytetramethyleneether glycol of molecular weight 2400 and the thiodiglycol-butanediol of Example 1A is made. The average molecular weight is 2180.

B. Polyisoprene diamine

Same as Example 1B

C. Polymer preparation

A mixture of 24.0 parts of the polytetramethyleneether glycol and 19.6 parts of the thiodiglycol-butanediol polymer is heated with 6.96 parts of toluene-2,4-diisocyanate at 80° C. for 2 hours to form a prepolymer.

To a solution of 44.1 parts of polyisoprene diamine (3B above) in 150 parts of tetrahydrofuran is added a solution of 47.5 parts of the prepolymer in 200 parts of tetrahydrofuran while stirring over a period of 1.75 hours at 25 to 30° C. There is then added 0.5 part of phenyl-β-naphthylamine and the solvent is evaporated. The polymer has an intrinsic viscosity of 0.72.

The polymer is milled on a rubber mill at 100° C. and then 6 parts of 1,3-bis(3-isocyanato-p-tolyl)urea is added for each 100 parts of polymer on the mill and thoroughly milled in. The polymer is cured by heating in molds in a press at 134° C. for 30 minutes. The cured elastomer has the following properties:

| | |
|---|---|
| Hardness | 69. |
| Hardness after 14 days at −20° C. | 72. |
| T-50 value | −38° C. |
| Bent loop after 5 days at −20° C. | Opens 80°. |
| Water swell—5 days at 30° C. | 2.69% wt. increase. |

EXAMPLE 4

A. Preparation of saturated polyisoprene diamine

A cooled stainless steel autoclave is charged, under nitrogen, with 2040 parts of isoprene, 3900 parts of toluene and 50 parts of 2,2'-azo-bis-isobutyronitrile. The autoclave is closed and the pressure brought up to 50 lbs./sq. in. with nitrogen. It is then heated rapidly to 90° C. and agitated at 90° C. for 5 hours. It is then cooled, vented, and discharged under nitrogen. The excess monomer and solvent are removed by distilling at 100° C. under reduced pressure. The clear residue is placed in a vessel with 1500 parts of air-free water and heated to the boil while agitating and maintaining an atmosphere of nitrogen in the vessel. Distillation of the water is then carried out until the temperature rises to 101° C. Then the mass is cooled, extracted with 870 parts of toluene, and the extract dried with 450 parts of CaSO₄. The toluene is removed by vacuum distillation to leave 310 parts of a clear liquid polymer of isoprene having —CN terminal groups. The infrared spectrum shows the presence of —CN groups and branching of the hydrocarbon structure. The iodine number is 362. The dicyanopolyisoprene is reduced by putting a solution of 63 parts of it in 80 parts of methyl-cyclohexane in a stainless steel autoclave with 50 parts of anhydrous ammonia, 20 parts of Raney nickel catalyst and 2 parts of palladium catalyst, pressuring with hydrogen at 6000 lbs. per square inch at 125° C. for 4 hours and then at 12,000 lbs. per square inch at 250° C. for 6 hours. The vessel is cooled, the pressure released, the catalyst filtered off under nitrogen, and the solvent and ammonia distilled off under vacuum. 56 parts of a clear viscous liquid is obtained. An infrared spectrum shows the absence of —CN groups, only a few C=C double bonds and presence of —NH₂ groups. The molecular weight of the saturated polyisoprene diamine is calculated to be 1900 from the analysis of 1.7% —NH₂ groups.

B. Preparation of polymer 42.0 parts of a polytetramethyleneether glycol, having a molecular weight of 2100, and 6.96 parts of toluene-2,4-diisocyanate are heated at 80° C. for 2 hours to form a prepolymer.

To a solution of 43 parts of the saturated polyisoprene diamine (4A above) in 250 parts of tetrahydrofuran is added a solution of 46 parts of the prepolymer in 250 parts of tetrahydrofuran with stirring over a period of 2 hours at 25 to 30° C. The solvent is evaporated to give an easy-milling polymer with an intrinsic viscosity of 0.69.

The polymer is milled on a rubber roll mill at 100° C. and there is then added 8 parts of 1,3-bis(3-isocyanato-p-tolyl)urea for each 100 parts of polymer on the mill. The polymer is cured by heating in molds in a press at 134° C. for 30 minutes. The resulting elastomer has the following properties:

| | |
|---|---|
| Tensile strength at the break (at 25° C. after 18 days) | 2250 lbs./sq. in. |
| Modulus at 300% elongation (25° C.—18 days) | 750 lbs./sq. in. |
| Hardness | 66. |
| T-50 value | −36° C. |
| Bent loop at −20° C. after 6 days | 70° opening. |
| Water swell −30° C., 6 days | 1.07% wt. gain. |
| Flexible after 5 days at −20° C. | |

C. Comparison

A control sample is made by heating 42 parts of a polytetramethyleneether glycol, having a molecular weight of 2100, with 7.03 parts of toluene-2,4-diisocyanate for 2 hours at 90° C. The polymer is dissolved in 150 parts of tetrahydrofuran and 3.6 parts of water is added for chain-extension. After standing 3 days, the solvent is evaporated. 90 parts of the polymer is milled with 7.2 parts of 1,3-bis(3-isocyanato-p-tolyl)urea and cured in molds in a press at 134° C. for 30 minutes.

The following table gives a comparison of Example 4 with the control above.

| Property | Polymer of Example 4B | Control |
| --- | --- | --- |
| $T_B$ | 2250 | 4650. |
| $M_{300}$ | 750 | 920. |
| $E_B$ | 470 | 490. |
| Hardness | 66 | 73. |
| Hardness at −20° C. | Flexible | 97 (not flexible). |
| Resilience | 75 | 76. |
| T-50 Value | −36° C. | +7° C. |
| Bent loop −20° C. | Opens 70° | Does not open. |
| Water swell | 1.1 | 2.4. |

The underlined values show appreciable improvement over the control.

EXAMPLE 5

A. A polytetramethyleneether glycol of molecular weight 2400 is used and 0.03 mol of water per mol of polytetramethyleneether glycol is thoroughly mixed in.

B. The saturated polyisoprene diamine of Example 4A is used.

C. Preparation of polymer 72 parts of the polytetramethyleneether glycol containing water (5A above) and 10.6 parts of toluene-2,4-diisocyanate are heated together for 2 hours at 80° C. to form a prepolymer.

To a solution of 50.6 parts of the saturated polyisoprene diamine (5B above) in 250 parts of tertahydrofuran is added a solution of 55.1 parts of the prepolymer in 300 parts of tetrahydrofuran over a period of 1 hour at room temperature. The solvent is then evaporated to give a polymer of intrinsic viscosity 0.58 which mills well on a rubber mill.

The polymer is milled on a rubber roll mill at 100° C. and then 4 parts of 1,3-bis(3-isocyanato-p-tolyl)urea is added for each 100 parts of polymer on the mill. After thorough milling, the polymer is cured by heating in molds in a press at 134° C. for 30 minutes. The resulting elastomer has the following properties at 25° C.:

| | 12 days after Preparation | After aging in Water at 100° C. | |
| --- | --- | --- | --- |
| | | 1 day | 3 days |
| Tensile strength at break, lbs./sq. in. | 2,220 | 2,020 | 1,820 |
| Modulus at 300% Elongation, lbs./sq. in. | 650 | 400 | 310 |
| Elongation at Break, Percent | 490 | 630 | 790 |

It is readily apparent that the elastomer has excellent resistance to the effects of water.

EXAMPLE 6

A. Polyether-thioether glycol

A mixture of 1000 parts of

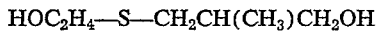
$HOC_2H_4$—S—$CH_2CH(CH_3)CH_2OH$ 34.3 parts of p-toluene sulfonic acid and 1000 parts of anhydrous xylene is made. The mixture is stirred and heated. At 120° C. an azeotrope of xylene and water begins to distill over. The water layer of the condensate is separated and the xylene is returned to the reaction vessel. The temperature reaches 140° C. in about 2.25 hours and about 110 parts of water is separated. The mixture is then cooled. About 150 parts of magnesium oxide is added to neutralize the acid and after stirring the mass is filtered. Approximately 9 parts of phenyl-β-naphthylamine is added as an antioxidant and the xylene is distilled from the filtrate. The residue is a colorless, free-flowing liquid which is washed with 0.5% sodium hydroxide solution to neutralize the last small amount of acidity and then washed with water until free of alkali. It is dried by heating under reduced pressure. The colorless liquid has a hydroxyl number of 75.4, a nil acid number and contains 0.055% water. The molecular weight is calculated to be 1490.

B. Preparation of polymer

An equimolar mixture of the homopolymer (6A above) and a polytetramethyleneether glycol, having a molecular weight of 2450, is made by mixing 14.9 parts of the former and 24.5 parts of the latter. To this mixture is added 6.96 parts of toluene-2,4-diisocyanate and the mass is heated for 2 hours at 80° C. to form a prepolymer. It is then cooled and 150 parts of tetrahydrofuran is added to dissolve it. To this prepolymer solution is added 3.6 parts of water which is thoroughly mixed in. After standing at room temperature for 2 days, the solvent is evaporated.

The resulting polymer is milled on a rubber roll mill at 100° C. It mills readily. For each 100 parts of polymer on the mill there is added 4 parts of 1,3-bis-(3-isocyanato-p-tolyl)urea. The compounded polymer is cured by heating in molds in a press at 134° C. for 30 minutes. The cured elastomer has the following properties:

| | |
| --- | --- |
| Hardness | 65. |
| Hardness after 14 days at −20° C. | 77. |
| Yerzley resilience | 77.5. |
| Solvent swell, 30° C., 6 days: | |
| Water | 0.52% wt. increase. |
| Octane | 10.9% wt. increase. |

C. Comparison (1) One control polymer is made by heating 44.7 parts of a homopolymer of

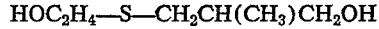
$HOC_2H_4$—S—$CH_2CH(CH_3)CH_2OH$ having a molecular weight of 1490, with 8 parts of toluene-2,4-diisocyanate for 3 hours at 80° C. The polymer is dissolved in 200 parts of tetrahydrofuran and 1.6 parts of water is added for polymer extension and the solution let stand at room temperature for 8 days. The solvent is evaporated and 100 parts of the polymer is mixed on a rubber roll mill with 10 parts of 1,3-bis-(3-isocyanato-p-tolyl)urea and then cured in molds in a press at 134° C. for 30 minutes.

(2) A control sample is made by heating 42 parts of a polytetramethyleneether glycol, having a molecular weight of 2100, with 7.03 parts of toluene-2,4-diisocyanate for 2 hours at 90° C. The polymer is dissolved in 150 parts of tetrahydrofuran and 3.6 parts of water is added for chain-extension. After standing 3 days, the solvent is evaporated. 90 parts of the polymer is milled with 7.2 parts of 1,3-bis(3-isocyanato-p-tolyl)urea and cured in molds in a press at 134° C. for 30 minutes.

These two controls are tested and compared with the polymer of Example 6B as shown in the table below:

| Property | Control 1 | Polymer of Example 6B | Control 2 |
| --- | --- | --- | --- |
| $T_B$ | 1080 | 3810 | 4650 |
| $M_{300}$ | 730 | 610 | 920 |
| $E_B$ | 420 | 660 | 490 |
| Resilience | 57.6 | 77.5 | 76.3 |
| Hardness | 66 | 65 | 73 |
| Hardness at −20° C., after 5 days | 68 | 77 | 97 |
| T-50 Value | −30° C. | −5° C. | +7° C. |
| Solvent swell: | | | |
| Water | 0.2 | 0.5 | 2.4 |
| Octane | 0.1 | 10.9 | 18.5 |

Inspection of the table shows the following points:
Control 1 is deficient in tensile strength and resilience for most uses as an unsupported elastomer. Control 2 suffers from a high T-50 value, poor water resistance and high hardness, particularly at low temperatures. On the other hand, the polymer of Example 6B shows a considerable improvement in all these deficiencies, as shown by the underlined values. It is to be noted that there is an obvious synergistic effect in most cases, the improvement being greater than might be predicted from consideration of the properties of the control samples.

EXAMPLE 7

A. Preparation of polyether glycol

To a solution of 2 mols of polytetramethylene ether glycol of molecular weight 985 and 1 mol of α,α'-dibromo-p-xylene is added 2.5 mols of potassium hydroxide over a period of about 4 hours while stirring and maintaining the temperature at 80° C. Stirring at 80° C. is continued for 24 hours after the addition of the potassium hydroxide. The reaction mass is then acidified by pouring it into aqueous hydrochloric acid. After separating the aqueous acidic layer, the mass is then washed with water until acid-free by the conventional process of stirring, letting stand and separating layers. The polymer is then dried by heating under reduced pressure. The molecular weight is calculated to be 2060 from the hydroxyl number.

The polyether-thioether glycol from the copolymerization of thiodiglycol and butane-1,4-diol of Example 1A is mixed with the above prepared alkylene-arylene in equimolar proportions.

B. Preparation of polymer 19.6 parts of the thiodiglycol-butanediol copolymer and 20.6 parts of the polyalkylene-aryleneether glycol are mixed and dried at 100° C. at a pressure of less than 1 mm. of mercury. This mixture is then heated with 4.35 parts of toluene-2,4-diisocyanate for 3 hours at 100° C. to form a prepolymer.

To a solution of 0.69 part of m-tolylene diamine in 100 parts of tetrahydrofuran is added a solution of 42 parts of the prepolymer in 150 parts of tetrahydrofuran over a period of 1 hour at 25 to 30° C. The solvent is then evaporated.

100 parts of the polymer is milled on a rubber mill and 4 parts of 1,3-bis(3-isocyanato-p-tolyl)urea is added and milled in. The compounded polymer is cured by heating in molds in a press at 134° C. for 30 minutes. The resulting elastomer has the following properties:

Hardness _____ 65.
Yerzley resilience _____ 74.
Bent loop at −20° C., after 7 days _ Opens 90°+.
T-50 value _____ −22° C.
Solvent swell, 6 days, 30° C.:
  Water _____ 2.1% wt. increase.
  Octane _____ 8.2% wt. increase.

C. Comparison (1) 103 parts of the polyalkylene-aryleneether glycol of 7A and 10.6 parts of toluene-2,4-diisocyanate are heated and mixed in a Werner-Pfleiderer mixer for 2 hours at 80° C. and then for 2 hours at 110° C. Then 1.71 parts of m-tolylene diamine is added at 100° C. and mixing is continued at 100° C. for 20 minutes. 100 parts of the resulting polymer and 4 parts of 1,3-bis(3-isocyanato-p-tolyl)urea are milled together on a rubber mill and cured in a press at 134° C. for 30 minutes.

(2) A polyether-thioether glycol is made by copolymerization of thiodiglycol and butane-1,4-diol. 366 parts of thiodiglycol, 270 parts of butane-1,4-diol, 9 parts of p-toluene sulfonic acid monohydrate and 132 parts of benzene are heated together for 96 hours while distilling a benzene-water azeotrope and condensing and separating the water layer, returning the benzene to the system. A total of 105 parts of water is removed. The polyether-thioether glycol is recovered by the process of Example 1A to give a product of molecular weight 1735 as calculated from the hydroxyl number.

34.7 parts of this polyether-thioether glycol and 4.46 parts of toluene-2,4-diisocyanate are heated together in a Werner-Pfleiderer mixer for 3 hours at 100° C. Then 35.5 parts of this prepolymer is dissolved in 100 parts of tetrahydrofuran and added to a solution of 0.75 part m-tolylene diamine in 100 parts of tetrahydrofuran while stirring at room temperature over a period of 1.3 hours. After a further 1.5 hours, the solvent is evaporated.

100 parts of this polymer and 4 parts of 1,3-bis(3-isocyanato-p-tolyl)urea are milled together on a rubber mill and then cured in a mold in a press at 134° C. for 30 minutes.

The properties of the two controls and Example 7 are shown in the table below:

|  | Control 1 | Polymer of Example 7B | Control 2 |
|---|---|---|---|
| $T_B$ | 4570 | 2400 | 1610 |
| $M_{300}$ | 730 | 730 | 680 |
| $E_B$ | 640 | 880 | 700 |
| Hardness | 67 | 65 | 62 |
| T-50 Value | −1° C. | −22° C. | −40° C. |
| Resilience | 74 | 76 | 69 |
| Solvent swell: | | | |
|   Water | 1.9 | 2.1 | 1.7 |
|   Octane | 18.6 | 8.2 | 1.8 |

EXAMPLE 8

A. Preparation of polyisoprene diamine 2720 parts of isoprene and 119.2 parts of 2,2'-azo-bis-isobutyronitrile are heated together in a pressure vessel under an atmosphere of nitrogen for 20 hours at 75° C. The mass is cooled, the pressure vented, and the solution removed and filtered. It is then steam-distilled with air-free steam under a nitrogen atmosphere to remove unpolymerized isoprene and tetramethylsuccinonitrile. The polyisoprene dinitrile is then extracted with about 3000 parts of ether. The ether solution is dried over $Na_2SO_4$. The iodine number of an isolated sample of the polyisoprene dinitrile is 376.

A solution of 30 parts of lithium aluminum hydride in 1400 parts of ether is prepared and heated to a gentle reflux. Then approximately 300 parts of the polyisoprene dinitrile/ether solution is added slowly with vigorous agitation. The mass is then stirred for 2 hours at a gentle reflux. Then 200 parts of water is added cautiously with vigorous stirring, the ether layer is separated and washed with water until free of inorganic salts and then dried over $Na_2SO_4$. The ether is then evaporated off. The polyisoprene diamine thus recovered has a molecular weight of 2075 based on the analysis for —$NH_2$ groups. Infrared spectra show the absence of —C≡N and =C=O groups.

B. Preparation of elastomer

The residual moisture in 120 parts of polytetramethyleneether glycol of molecular weight 2400 is removed by heating at 100° C. at 0.6 mm. of mercury pressure for 30 minutes. Then 17.4 parts of toluene-2,4-diisocyanate is stirred in at 80° C. and heating continued at 80° C. for 2 hours to form a prepolymer. The prepolymer is cooled and dissolved in 356 parts of tetrahydrofuran.

This solution is added slowly over a period of 2.5 hours to a solution of 124.5 parts of polyisoprene diamine (8A above) in 445 parts of tetrahydrofuran. The solvent is then evaporated.

C. Sulfur vulcanizate 100 parts of the polymer is mixed on a rubber roll mill with 50 parts of easy processing channel black at 100° C. for 10 minutes. Then 2 parts of sulfur, 5 parts of zinc oxide, and 1 part of mercaptobenzothiazole are milled in. The stock is cured in molds in a press at 134° C. for 30 minutes. The cured elastomer has the following properties:

Tensile strength at the break _____ 4300 lbs./sq. in.
Modulus at 300% elongation _____ 2430 lbs./sq. in.
Elongation at the break _____ 460%.
Hardness _____ 70.
T–50 value _____ −17° C.
Solvent swell:
    Water _____ 0.59% wt. increase.
    Octane _____ 41% wt. increase.

D. 1,3-bis(3-isocyanato-p-tolyl)urea cure 100 parts of the polymer is milled with 50 parts of easy processing channel black on a rubber roll mill for 10 minutes at 100° C. Then 4 parts of 1,3-bis(3-isocyanato-p-tolyl)urea is milled in. The stock is cured in molds in a press at 134° C. for 30 minutes.

Tensile strength at the break _____ >5100 lbs./sq. in.
Modulus at 300% elongation _____ 3790 lbs./sq. in.
Elongation at the break _____ 370%.

These two vulcanizates are immersed in boiling water for 3 days and then removed and allowed to stand several days at room temperature at 50% relative humidity.

A control is made from polytetramethyleneether glycol of molecular weight 2100 and toluene-2,4-diisocyanate in the same molar ratio as this example and extended with water instead of polyisoprene diamine. The change in stress strain properties of the three elastomers is shown in the following table (the measurements are at 25° C.):

| Sample | Test | Original | 1 day at 100° C. | 3 days at 100° C. |
|---|---|---|---|---|
| Control | $T_B$ | 5100 | 1620 | 480. |
|  | $T_{300}$ | 5100 | 1310 | 480. |
|  | $E_B$ | 300 | 360 | 300. |
| 8C | $T_B$ | 4300 | 3400 | 2700. |
|  | $T_{300}$ | 2430 | 3050 | (1630 at 200%). |
|  | $E_B$ | 460 | 320 | 270. |
| 8D | $T_B$ | >5100 | 3980 | 2300. |
|  | $T_{300}$ | 3790 | 3010 | 1870. |
|  | $E_B$ | 370 | 370 | 350. |

It is readily apparent that the inclusion of the two polymer segments in the elastomer gives very appreciably greater resistance to the effect of hot water on the elastomer.

EXAMPLE 9

25.1 parts of polytetramethyleneether glycol, molecular weight 1005, and 5.22 parts of toluene-2,4-diisocyanate are stirred together at 80 to 90° C. for 1 hour followed by heating at 110° C. for 2 hours to form an isocyanate-terminated prepolymer. A solution of 27.5 parts of the prepolymer in 89 parts of tetrahydrofuran is added slowly (over 1.25 hours), while stirring, to a solution of 10.5 parts of the hydrogenated polyisoprene diamine of Example 4A in 67 parts of tetrahydrofuran at 25 to 30° C. Stirring is continued an additional 15 minutes. The solvent is then evaporated and a soft plastic polymer is obtained.

12 parts of this plastic polymer is milled on a rubber mill with 0.48 part of 1,3-bis(3-isocyanato-p-tolyl)urea and the compounded product cured in molds in a press at 134° C. for 30 minutes. The cured elastomer has the following properties:

Tensile strength at the break _____ 2720 lbs./sq. in.
Modulus at 300% elongation _____ 430 lbs./sq. in.
Elongation at the break _____ 570%.
Hardness _____ 63.
T–50 value _____ −41° C.
Bent loop—did not freeze in 1 day at 20° C.

EXAMPLE 10

36.5 parts of dry polytetramethyleneether glycol, having a molecular weight of 910, is stirred with 8.35 parts of toluene-2,4-diisocyanate for 3 hours at 110° C. to form a prepolymer. The prepolymer is dissolved in 133 parts of tetrahydrofuran and added to a solution of 9.6 parts of polyisoprene diamine of molecular weight 1000 (prepared by the same general procedure as Example 8A from 681 parts of isoprene and 126 parts of 2,2′-azo-bisisobutyronitrile) in 89 parts of tetrahydrofuran. The addition is made while stirring over a period of 1.25 hours at 25 to 30° C. The solvent is then evaporated.

80 parts of the resulting polymer and 6.4 parts of 1,3-bis(3-isocyanato-p-tolyl)urea are milled together on a rubber roll mill and then cured in molds in a press at 134° C. for 30 minutes. The resulting elastomer has a tensile strength at the break of 2040 lbs./sq. in. (25° C.) and a bent loop is not frozen after 5 days at −20° C.

EXAMPLE 11

As an illustration of the versatility of the products of this invention, an elastomer is made according to the processes above from 1 mol of polytetramethyleneether glycol, having a molecular weight of 2400, 2 mols of toluene-2,4-diisocyanate and 1 mol of polyisoprene diamine, having a molecular weight of 2075. Three cured samples are prepared using 100 parts of the above, 100 parts of natural rubber and 100 parts of a 50:50 blend of the elastomer and natural rubber, in each case with 50 parts of easy processing channel black, 5 parts of zinc oxide, 2 parts of sulfur and 1 part of mercaptobenzothiazole, and curing at 134° C. for 30 minutes.

The properties are shown below:

|  | Elastomer | Natural Rubber | 50:50 Blend |
|---|---|---|---|
| Tensile strength at break, lbs./sq. in. | 3050 | 3450 | 3020 |
| Modulus at 300 Percent Elongation, lbs./sq. in. | 1300 | 1440 | 1770 |
| Elongation at break, Percent | 500 | 470 | 450 |

Another blend is made using 67 parts elastomer and 33 parts natural rubber and compounding as above. Strips are then placed between strips of polyalkyleneether glycol-diisocyanate elastomer prepared as in Example 2C2 and compounded with 4 parts of 1,3-di(3-isocyanato-p-tolylene)urea and strips of natural rubber compounded as above and cured at 134° C. for 30 minutes. The adhesion is tested on a Scott tester at 25° C. and 70° C. and shows an average of about 20 lbs. per inch (range of individual samples 16–23) while a control sample of natural rubber to polytetramethyleneether glycol-diisocyanate elastomer showed 0 lb. per inch. It could be pulled apart by hand.

EXAMPLE 12

549 parts of thiodiglycol, 405 parts of 1,4-butanediol, 13.5 parts of p-toluene sulfonic acid and 175 parts of benzene are stirred and heated together in a vessel fitted with a Dean-Stark trap for 69 hours at the reflux, the water being separated and the benzene being returned to the reaction vessel. During this time 114 parts of water is removed and the temperature rises from 85 to 98° C. Then the benzene is removed along with the water until the temperature reaches 134° C. Total water removed is 141 parts. 82.3 parts of thiodiglycol is added and an additional 15 parts of water is distilled off. The polyether-thioether is purified as in the previous example. Analysis is as follows:

Acid No. _____ Nil.
Ester No. _____ Nil.
Percent S _____ 20.4.
Percent $H_2O$ _____ .004.
OH No. _____ 116.
Mol. wt. _____ 965 (by OH No.).

B. Preparation of polymer 96.5 parts of polyalkyleneether-thioether glycol (12A above) and 92.5 parts of polytetramethyleneether glycol, having a molecular weight of 965, and 0.97 part of phenyl-β-naphthylamine are stirred together and heated to 80° C. Then 23.4 parts of toluene-2,4-diisocyanate is added and the mass stirred at 100° C. for 3 hours. Analysis shows the absence of —NCO groups.

211.2 parts of this hydroxyl-terminated polyurethane is heated to 60° C. and 23.1 parts of toluene-2,4-diisocyanate is added. The mixture is stirred 17 hours and an isocyanate-terminated prepolymer is formed.

230.9 parts of this prepolymer is dissolved in 928 parts of dry tetrahydrofuran and 12.1 parts of water is added. The solution is allowed to stand at room temperature for 94 hours for chain-extension to take place. The tetrahydrofuran is evaporated and the residual solvent is removed by heating for 5 hours at 65° C. under vacuum and then overnight at room temperature at a pressure of 0.5 mm. of mercury.

100 parts of the polymer is milled on a rubber mill at 100° C. with 15 parts of carbon black and 0.5 part of mercaptobenzothiazole for 10 minutes. Then 6 parts of 1,3-bis(3-isocyanato-p-tolyl)urea is milled in. The compounded elastomer is cured by heating in molds under pressure at 134° C. for 30 minutes.

C. Controls

One control sample is made from polyalkylene-ether-thioether glycol, having a molecular weight of 965 and another from polytetramethyleneether glycol, having a molecular weight of 965, by exactly the same procedure using the following quantities:

|  | Control No. 1 | Control No. 2 |
|---|---|---|
| Polyether-thioether glycol | 193 |  |
| Polytetramethyleneether glycol |  | 194.2 |
| Toluene-2,4-diisocyanate | 23.4 | 24.7 |
| Phenyl-β-naphthylamine | 1.93 | 1.93 |
| Polyurethane glycol | 215.4 | 211.5 |
| Toluene-2,4-diisocyanate | 23.0 | 23.7 |
| Prepolymer (isocyanate-terminated) | 234.8 | 233.5 |
| Tetrahydrofuran | 990 | 948 |
| Water | 11.2 | 12.4 |

Samples of each are compounded and cured in the same way as the polymer.

The samples show the following properties:

|  | Control No. 1 | Polymer of 12B | Control No. 2 |
|---|---|---|---|
| Tensile strength at the break, lbs./sq. in. | 2,800 | 3,580 | 4,960 |
| Modulus at 300% elongation, lbs./sq. in. | 1,450 | 1,770 | 2,000 |
| Elongation at break, Percent | 470 | 460 | 470 |
| Yerzley resilience | 63 | 65 | 68 |
| Hardness, Shore | 74 | 76 | 75 |
| T-50 Value | −31.5 | −38 | −9.5 |

EXAMPLE 13

24 parts of polytetramethyleneether glycol of molecular weight 2400 is stirred with 4.2 parts of naphthalene-1,5-diisocyanate for 45 minutes at 80° C. and then for 75 minutes at 100° C. The viscous prepolymer is dissolved in 89 parts of tetrahydrofuran. To this solution is added a solution of 21.1 parts of the saturated diamine of Example 4A in 89 parts of tetrahydrofuran slowly over a period of 75 minutes while stirring. The tetrahydrofuran is evaporated.

100 parts of the polymer is milled on a rubber mill at 100° C. and then 6 parts of 1,3-bis(3-isocyanato-p-tolyl)- urea is milled in. The compounded polymer is cured in molds in a press at 134° C. for 30 minutes. The resulting elastomer has a T–50 value of −15° C. whereas when a simple diamine such as m-phenylene diamine is used as a chain-extender, the T–50 value is some 20 to 25° C. higher.

It is obvious from the foregoing examples that the elastomers of the present invention possess a better balance of properties than do elastomers prepared from the individual polymeric segments alone. Very frequently an elastomer may have a number of very excellent physical properties but the lack of some one essential property will negate all the other advantages. Thus, some of the elastomers made from single polymeric species are quite difficult to process on normal rubber processing machinery but when modified according to this invention, become satisfactorily processable without sacrificing any significant degree of their excellent properties.

On the other hand, one polymeric species may yield an elastomer deficient in tensile strength while having excellent low temperature properties and solvent resistance. The introduction of another polymeric species of a different class will cure the tensile fault without seriously harming the excellent properties.

One particular advantage of the segmented elastomers containing an unsaturated polyhydrocarbon segment is that they may be used in adhesive relationship to natural or synthetic rubber and conventional polyether glycol-diisocyanate urethane rubber in the adherence of tread stocks to rubber tire carcasses.

The elastomers prepared according to this invention have many varied uses. They may be employed in the preparation of tires, inner tubes, belts, hose and tubing, wire and cable jackets, footwear, sponges, coated fabrics, and a wide variety of coated or molded articles.

The elastomeric properties of these materials may be varied by suitable compounding. The amount and type of compounding agent to be incorporated in the stock is dependent upon the use for which the elastomer is intended. The compounding agents ordinarily used in the rubber industry with either natural or synthetic rubber are useful with the products of this invention. These include carbon black, clay, silica, esterified silica particles, talc, zinc and magnesium oxides, calcium and magnesium carbonate, titanium dioxide, and plasticizers. Inorganic and organic coloring agents may be incorporated to give well-defined colors, as the natural color of these elastomers is a pale yellow or light amber.

As many widley different embodiments of this invention may be made without departing from the spirit and scope thereof, it is to be understood that this invention is not limited to the specific embodiments thereof except as defined in the appended claims.

What is claimed is:

1. A segmented, isocyanate-based polymer, containing at least two different classes of polymeric radicals, said polymer consisting essentially of interconnected units having the formula:

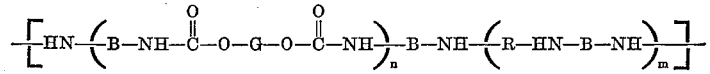

wherein O—G—O is a bivalent, polymeric radical obtained by removing the terminal active hydrogen atoms from an organic compound having a molecular weight of at least 750 selected from the group consisting of the following classes: (1) polyalkyleneether glycols, (2) polyalkylene-aryleneether glycols, (3) polyhydrocarbon glycols of the formula HO—L—OH wherein L is a bivalent radical formed by the polymerization of ethylenically unsaturated monomers at least 50 percent of which are conjugated dienes, (4) polyalkylene-aryleneether-thioether glycols and (5) polyalkyleneether-thioether glycols; B is a bivalent, non-polymeric, organic radical, said radical being inert to isocyanate groups; R is a bivalent radical selected from the group consisting of carbonyl, non-polymeric diacyl radicals and polymeric hydrocarbon radicals containing terminal acyl groups, said polymeric hydrocarbon radicals being formed by the polymerization of ethylenically unsaturated monomers at least 50 percent of which are conjugated dienes, with the proviso that when R is a polymeric hydrocarbon radical containing terminal acyl groups, O—G—O is other than a radical obtained from said polyhydrocarbon glycol; $n$ is an integer greater than zero; and $m$ is an integer including zero; each of said units being connected to the next by a radical selected from the group consisting of carbonyl radicals, non-polymeric diacyl radicals and polymeric diacyl radicals the polymeric portion of which is selected from the group consisting of the following classes: (1) polyalkyleneether radicals, (2) polyalkylene-aryleneether radicals, (3) polymeric hydrocarbon radicals formed by the polymerization of ethylenically unsaturated monomers at least 50 percent of which are conjugated dienes, (4) polyalkylene-aryleneether-thioether radicals and (5) polyalkyleneether-thioether radicals, with the proviso that when said units are connected by a polymeric diacyl radical, the polymeric O—G—O radical is not of the same class as the polymeric diacyl radical; there being at least two different of said classes of polymeric radicals in the polymer with not more than 95 mol percent of any one present and at least 60 percent of the total weight of the polymer being polymeric radicals, each of said polymeric radicals having a molecular weight of at least about 750.

2. The polymer of claim 1 wherein the bivalent, non-polymeric organic radical B is an arylene radical.

3. The polymer of claim 1 wherein the bivalent, non-polymeric organic radical B is a 2,4-tolylene radical.

4. The polymer of claim 2 wherein one of the polymeric radicals is a bivalent radical obtained by removing the terminal hydrogen atoms from a polyalkyleneether glycol and the other polymeric radical is a polymeric diacyl radical, the polymeric portion of which is a bivalent polyunsaturated hydrocarbon radical formed by the polymerization of ethylenically unsaturated monomers at least 50 percent of which are conjugated dienes.

5. The polymer of claim 3 wherein one of the polymeric radicals is a bivalent radical obtained by removing the terminal hydrogen atoms from a polytetramethyleneether glycol and the other polymeric radical is a polymeric diacyl radical, the polymeric portion of which is a bivalent polyisoprene radical.

6. The elastomeric reaction product of a polyalkyleneether glycol having a molecular weight of at least 750, a molar excess of a non-polymeric, organic diisocyanate and a polyhydrocarbon diamine having a molecular weight of at least 750, the polymeric portion of said diamine being formed by the polymerization of ethylenically unsaturated monomers at least 50 percent of which are conjugated dienes.

7. The product of claim 6 wherein the polyalkyleneether glycol is a polytetramethyleneether glycol and the polyhydrocarbon diamine is a polyisoprene diamine.

8. The product of claim 7 wherein the non-polymeric, organic diisocyanate is an arylene diisocyanate.

9. A cured elastomer obtained by reacting the polymer of claim 1 with an organic polyisocyanate.

10. A cured elastomer obtained by heating the polymer of claim 4 with sulfur.

11. A cured elastomer obtained by heating the polymer of claim 1 with an organic polyisocyanate and sulfur.

12. A linear polymer containing two different classes of polymeric radicals, said polymer having the formula:

OCN—B(NH—CO—O—G—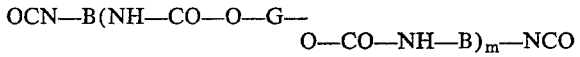O—CO—NH—B)$_m$—NCO wherein O—G—O is a bivalent, polymeric radical obtained by removing the terminal active hydrogen atoms from an organic compound having a molecular weight of at least 750 selected from the group consisting of the following classes: (1) polyalkyleneether glycols, (2) polyalkylene-aryleneether glycols, (3) polyhydrocarbon glycols of the formula HO—L—OH wherein L is a bivalent radical formed by the polymerization of ethylenically unsaturated monomers at least 50 percent of which are conjugated dienes, (4) polyalkylene-aryleneether-thioether glycols and (5) polyalkyleneether-thioether glycols; B is a bivalent non-polymeric, organic radical, said radical being inert to isocyanate groups, and $m$ is an integer greater than zero; with the proviso that there be at least two different of said classes of radicals represented by O—G—O, there being not more than 95 mol percent of any one.

13. The polymer of claim 12 wherein from 5 to 95 mol percent of the bivalent radicals represented by O—G—O are the residues resulting from the removal of terminal hydrogen atoms from a polyalkyleneether glycol and from 95 to 5 mol percent of the radicals represented by O—G—O are the residues resulting from the removal of the terminal hydrogen atoms from a polyalkyleneether-thioether glycol.

14. The polymer of claim 13 wherein the bivalent, non-polymeric, organic radical B is a 2,4-tolylene radical.

15. The elastomeric reaction product of a polyalkyleneether glycol, having a molecular weight of at least 750, a polyether-thioether glycol, having a molecular weight of at least 750, a non-polymeric, organic diisocyanate, the said diisocyanate being in stoichiometric excess with respect to the glycols, and a chain-extending agent having a plurality of active hydrogen atoms capable of reacting with isocyanates, no more than two atoms in the molecule of the said chain-extending agent having active hydrogen attached thereto, said chain-extending agent being a member of the class consisting of water, hydrogen sulfide and non-polymeric, organic compounds containing two functional groups in the molecule to which are attached active hydrogen atoms, with at least 60 percent of the total weight of the product comprising polymeric radicals derived from said polyalkyleneether glycol and said polyether-thioether glycol by removal of the terminal hydrogen atoms from said glycols, there being not more than 95 mole percent of any one such radical.

References Cited in the file of this patent

UNITED STATES PATENTS

| | | |
|---|---|---|
| 2,692,874 | Langerak | Oct. 26, 1954 |
| 2,734,045 | Nelson | Feb. 7, 1956 |
| 2,780,350 | Simon | Feb. 5, 1957 |
| 2,814,605 | Stilmar | Nov. 26, 1957 |
| 2,814,606 | Stilmar | Nov. 26, 1957 |
| 2,835,654 | Carter et al. | May 20, 1958 |